March 7, 1944. A. H. REIBER Re. 22,453
PRINTING TELEGRAPH APPARATUS
Original Filed June 6, 1938
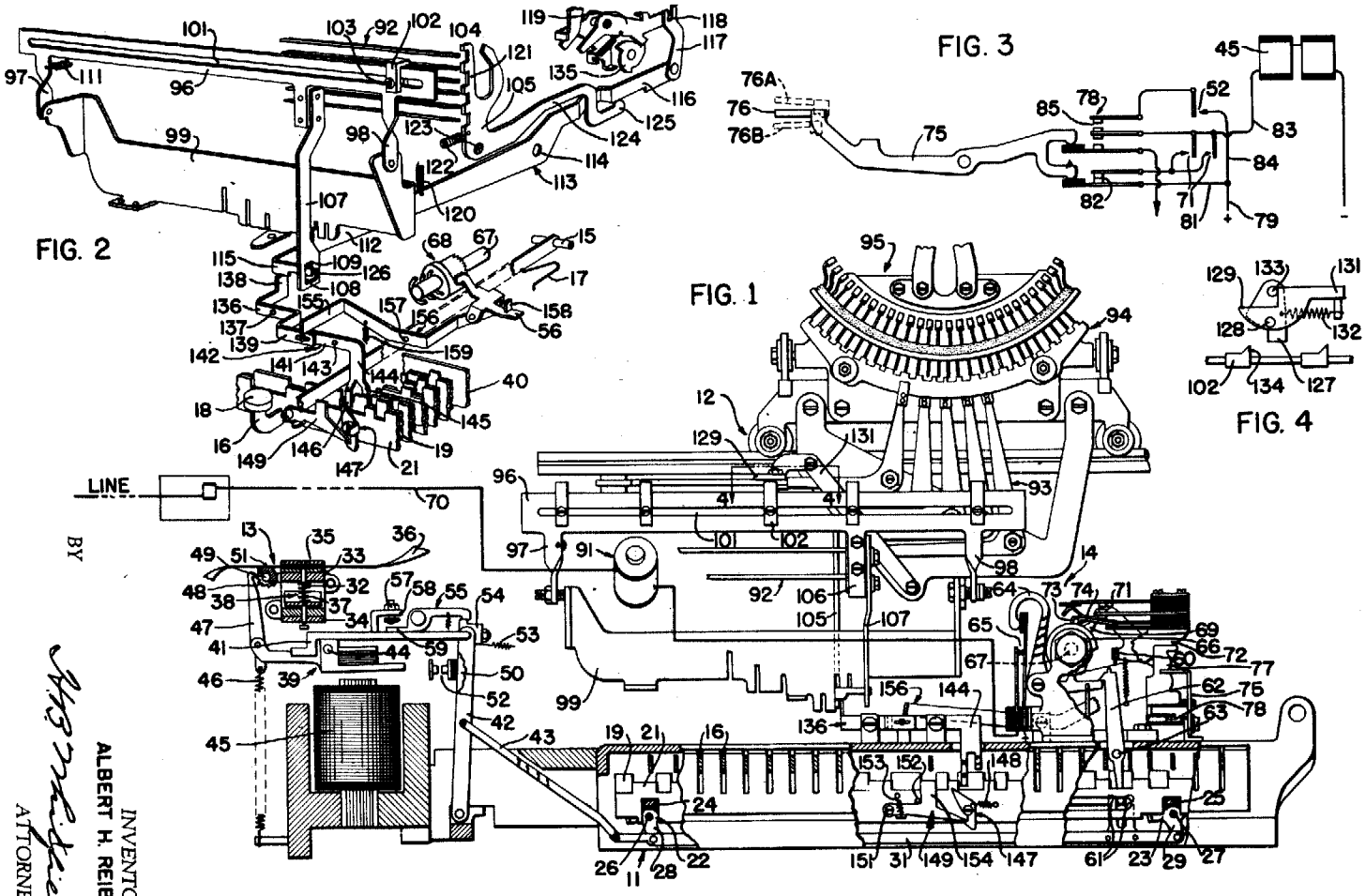
INVENTOR.
ALBERT H. REIBER
BY
H. B. Whitfield
ATTORNEY.

Reissued Mar. 7, 1944

Re. 22,453

UNITED STATES PATENT OFFICE 22,453

PRINTING TELEGRAPH APPARATUS

Albert H. Reiber, Evanston, Ill., assignor to Teletype Corporation, Chicago, Ill., a corporation of Delaware Original No. 2,253,532, dated August 26, 1941, Serial No. 212,038, June 6, 1938. Application for reissue May 16, 1942, Serial No. 443,298

37 Claims. (Cl. 178—4)

The present invention relates to printing telegraph apparatus and more particularly to types of such apparatus capable of tabular recording.

The salient object of the invention is the provision of means included in a keyboard perforator which will be effective to prepare a control strip for controlling by telegraph the recordation of tabular matter.

Another object of the invention is to provide a telegraph mechanism comprising a keyboard, a transmitter and a receiver, with means for exercising a predetermined control over the transmitter by the keyboard, and means controlled by a selectable instrumentality in the receiver responsively to signals received from the transmitter, for varying the control exercised over the transmitter by the keyboard.

Another object of the invention is to produce a signal control strip so perforated as to provide variable tabulation time intervals by automatically inserting in the control strip variable pluralities of tabulation-time code signals having non-spacing, non-printing nature.

A feature resides in providing in a keyboard perforator or keyboard transmitter, additional mechanism controlled by tabulator mechanism for automatically changing or altering, under certain conditions of operation, the key-controlled setting of the permutation elements from a tabulator initiating code combination to a preferably non-printing, non-spacing code combination effective to prolong a tabulating condition in a controlled tabulating receiver.

To achieve the above and other objects of the invention, a keyboard perforator and transmitter of the type disclosed in U. S. Patent No. 1,965,572 is modified for the production of perforated tape to control the transmission of message matter embracing tabulation operations.

In printing telegraph systems employing recording apparatus provided with tabulating mechanism, a variable interval of time is required to move the type carriage or platen carriage from one tabular position to another. This interval will be termed "tabulating time" in this application. In manual operation of key controlled recording apparatus cognizance is taken of tabulating time by the operator, who, during such time, refrains from operation of the keyboard. However, in automatic operation of such recording apparatus under remote control of tape transmitters wherein the apparatus is unattended for extended periods of time, it is desirable to simulate manual control during tabulation so as to maintain a tabulating condition automatically during the time that the carriage is in motion while tabulating, thus attaining proper tabular operation of the recording apparatus.

The present invention provides for an operative association of a keyboard transmitter with a receiving printer, whereby the receiving printer may be made to respond to operation of the keyboard transmitter simultaneously with perforation of a tape. Such an arrangement produces a printed copy or home record corresponding to the perforations in the tape, and allows an operator to determine easily and quickly whether the keyboard operations correspond with the message desired to be transmitted which will be effected by advancing the perforated tape through a tape transmitter.

Specifically, when a record of perforated nature is made involving tabulated portions, it is expedient to compensate at the transmitter for the tabulation time required at the recorder, either by suspending transmission during tabulation, as disclosed in U. S. Patents 2,104,071 and 2,104,110, or by employing the arrangement or method of the present invention, which continues transmission but suspends printing. In the type of tabulating recorder disclosed in U. S. Patents No. 2,104,071 and 2,104,110 a tabulator bar extends across the front of the machine, is carried by brackets mounted in the typing unit, and is capable of swinging toward and away from the type carriage. The tabulator bar carries a number of adjustable stop members which determine positions to any of which the type carriage is automatically propelled through a distance equivalent to a plurality of character spaces following the reception of a tabulator code signal combination.

According to the method embraced by this invention, the tabulator key of the keyboard is operated to set the keyboard permutation elements for a tabulation initiation code signal, the home recorder responds to code signal impulses generated by the transmitter and effects three functions; namely, it initiates within itself the tabulating operation involving the feature of tabulating time, it modifies the keyboard setting, and it initiates continuous and repeated operation of the transmitter. The modified setting of the keyboard permutation mechanism sets the transmitter elements for a tabulating time continuation code signal which has the function of consuming line time. During the progress of the carriage in tabulating time at the home recorder, the transmitter transmits repeatedly and the tape perforator perforates repeatedly the code signal for tabulating time continuation. This tabulating time continuation code signal preferably is selected to be ineffective upon any printing member, although this feature is not fundamental to the invention since were the hyphen type or period type or underscore type responsive to the signal, the result would be a line of printel characters of the nature selected, thus leading the eye of the reader from one tabulation column along a line of legibility to the next tabulation column, which effect may be desirable, particularly in case of tabulation columns widely separated upon a page. The continuation code signal also is desirably non-spacing in the sense that if such a signal were received by a receiving tabulating printer after the carriage has stopped in response to tabulation control, it is desirable that response to the continuation code signal will not step the carriage from its tabulation control position.

A better understanding of the present invention may be had from the following description taken in conjunction with the accompanying drawing wherein like reference characters are used to designate similar parts throughout the several figures, and wherein:

Fig. 1 is a front elevational view, partly in section, of a keyboard perforator and transmitter embodying the present invention;

Fig. 2 is a fragmental perspective view of the arrangement according to the present invention;

Fig. 3 is a schematic electrical diagram of the perforator magnet operating circuit; and Fig. 4 is a detailed sectional view taken on line 4—4 of Fig. 1.

Having reference to Fig. 1 there is shown a receiving printer of the type disclosed in U. S. Patent No. 1,904,164 to which is associated a tabulator mechanism, a keyboard, a perforator, and a transmitter. This combined apparatus comprises a base portion, indicated generally by the numeral 11, upon which is mounted a typing unit, indicated generally as 12. Associated with the base portion 11 is a perforator, indicated generally as 13, and a transmitting portion, indicated generally as 14.

Positioned at the rear of the base portion 11 is a pivot rod 15 (Fig. 2), which extends transversely of the base portion. To the pivot rod 15 a plurality of key levers 16 are rotatably mounted which are normally urged upwardly by individual springs 17, and which are provided, as in the usual practice, at their forward end with keys 18 arranged in banks. Beneath the key levers 16, and extending transversely thereof, are a plurality of pairs of permutation bars 19 and 21. As is well known, the number of pairs of permutation bars corresponds to the number of elements in the permutation code, for example, five or six. The permutation bars 19 and 21 are provided at each end with vertical slots or notches 22 and 23, respectively, which fit over guide combs 24 and 25, containing rods 26 and 27. The bars 19 and 21 are thus held against longitudinal movement, but are free to be shifted vertically in response to the operation of key levers 16.

Pivotally mounted on rods 26 and 27 are pairs of rocker arms 28 and 29 interposed between each pair of bars 19 and 21. The rocker arms 28 and 29 are substantially T-shaped, with their free ends formed with off-set lugs on opposite sides of the pivot rods 26 and 27 and spaced some distance therefrom, one of the lugs of each rocker arm projects forwardly beneath the lower edge of the corresponding permutation bar 21, and its other lug projects rearwardly beneath the companion permutation bar 19. With this arrangement, the depression of either permutation bar of the pair of bars 19 and 21 rocks the arms 28 and 29 and lifts the companion permutation bar. To the depending portion of the T-shaped rocker arms 28 and 29 is pivotally articulated a longitudinally movable link 31. Thus, when the permutation bars 19 and 21 are moved vertically in accordance with a key lever 16, the link 31 individual to a pair of the permutation bars 19 and 21 is moved longitudinally, or in the direction of its length.

Each of the key levers 16 is arranged, when operated, to engage and depress one of the permutation bars of each pair of permutation bars 19 and 21 and to set these permutation bars in accordance with a character code combination. To achieve this object, the upper edges of the parmutation bars 19 and 21 are notched to provide high and low portions in accordance with the respective code signals. Also, the bars of each pair of permutation bars 19 and 21 are complementary; that is, the notches of one bar are opposite the projections of its companion bar. The interconnection between the bars of each pair of bars 19 and 21 by means of the rocker arms 28 and 29 prevents the simultaneous depression of two key levers. If an attempt is made to operate more than one key lever, the key levers can only be depressed for a short distance, when they will be blocked by the high portion of the permutation bars 19 and 21. By this construction, the simultaneous depression of two key levers and the transmission of an incorrect signal is prevented.

The perforator 13 comprises a set of code punches 32 movable through an opening in upper and lower guide plates 33 and 34, and cooperative with a die plate 35 to perforate a tape 36. The plates 33 and 35 are spaced apart to form a tape guide. Intermediate the guide plates 33 and 34 is a stripper plate 37 which cooperates with shoulders on the code punches 32 and feed hole punch pin (not shown), and due to the action of springs 38 operates to remove the punches clear of the tape following the operation of a punch hammer 39. The code punches 32 are selectively operated by an actuating member or punch hammer 39 and a set of interponent bars 41 corresponding in number to the punches 32. Operatively associated with each of the bars 41 is a pivoted arm 42 which is connected to a link 31 by means of a connecting bar 43.

The hammer 39 rocks about its pivot 44 and forms the armature of an electromagnet 45. The interponents 41 are adapted to slide on the hammer 39. When the perforating magnet 45 is unenergized, the hammer 39 is retained in its counterclockwise position by a spring 46. Punch hammer 39 carries at the left end thereof a pawl member 47 which cooperates with ratchet teeth 48 of a spacing roller 49 which is also provided with feed pins 51 adapted to mesh with the feed holes which are invariably perforated in the tape 36. Thus, when the magnet 45 is energized and the hammer 39 is rocked to its clockwise position, pawl 47 is raised to engage a tooth 48 on the spacing roller 49. Then, upon the deenergization of magnet 45, spring 46 actuates the hammer 39 to its counterclockwise position and draws the pawl 47 downwardly, which movement causes the spacing roller 49 to be rotated counterclockwise one angular step to effect the spacing of the tape 36 one unit distance.

To prevent repeated operation of the perforating magnet 45 due to the chattering of the operating contacts 52 in response to a tremulous touch of a key 16 and thus to insure a single operation of the perforating magnet 45 upon each depression of a key lever 16, an anti-chatter means is provided. In addition to the five (or six) pairs of permutation bars 19 and 21 there is provided an additional bar 40, the link 31 of which is connected by a bar similar to 43 to a contact operating lever 50. Associated with contact operating lever 50 is a pair of contacts 52. In the unoperated position of the apparatus, the contact operating lever 50 is held in its clockwise position by a spring 53, which constitutes also a return spring for the universal bar 40, and through control of an insulated striker the contacts 52 are held open. Then, upon the operation of a key lever 16, the contact operating lever 50 is operated counterclockwise to close the contacts 52 and, at its end 54, it becomes engaged by a latch member 55, thus latching the contacts 52 closed. When the magnet 45 becomes energized and its armature is attracted to rotate the print hammer 39 clockwise, an adjustable striker 57 carried on a bracket 58 integral with print hammer 39 acts upon arm 59 of latch lever 55 to rock the latch 55 counterclockwise, thus disengaging said latch from the end portion 54 of lever 50 whereupon lever 50 is rocked clockwise by its spring 53 to permit contacts 52 to open. It is thus seen that with this anti-chatter arrangement, the energizing of the punch magnet 45 is independent of a tremulous touch on a key lever 16 since, as soon as the key has been depressed to close contacts 52, the latch 55 acts immediately to maintain said contact 52 in the closed position, whereafter they will be opened only upon energization of magnet 45 and operation of hammer 39 through the cooperation of striker 57 and arm 59.

When the keyboard of the perforating mechanism 13 is employed in combination also with a keyboard transmitter 14, the permutation links 31 are each provided with a pair of upstanding guide lugs 61. Interposed between each pair of lugs 61 is a depending arm of a locking latch 62, pivoted on a common rod 63. In this manner, locking latches 62 are pivotally articulated to the permutation links 31, and are adapted to be rocked about pivot rod 63 to either of two positions. Associated with latches 62 are a corresponding series of contact levers 64 for making and breaking individual contacts 65. Contact levers 64 cooperate with individual contact cams 66 mounted on the transmitting shaft 67 provided with a clutch mechanism 68 (Fig. 2) controlled by a trip member 56 connected to a universal bar member (not shown) as set forth in U. S. Patent No. 1,965,572.

In the operation of the transmitting unit, the depression of a key lever 16 moves the permutation bars 19 and 21 permutably in accordance with a predetermined code combination, the setting of which, through links 31, determines the position of the locking latches 62. The rotation of the cam 66 is initiated substantially simultaneously with the setting of the locking latches 62, through the instrumentality of trip member 56, which is acted upon by the universal bar (not shown). A locking loop 60 (Fig. 1), controlled by a cam 69, carried on the shaft 67, is permitted to rotate in a counterclockwise direction, as viewed in Fig. 1, to lock the latches 62 in their selected position. The setting of latches 62 determines whether the contact levers 64 shall or shall not be operated by their associated cams 66 to transmit, through contacts 65, over a signal line 70, to a receiving station (one of which is indicated by a line magnet contained within a rectangle shown intermediate the ends of line 70), a predetermined code combination of signaling impulses. The receiving station indicated by the rectangle containing the line magnet connected in line 70 may, of course, represent a receiving printer or a reperforator. The respective notches in the cams 66 are arranged in a helical progression so that upon the rotation of the cam assembly, the contacts 65 controlled by levers 64 will be operated successively. The apparatus herein disclosed is operated in accordance with an equal length letter code in which each code combination is a permutation of marking and spacing conditions, and is preceded by a start impulse and followed by a stop impulse according to the familiar start-stop system.

When the perforator and transmitter are to be operated simultaneously under the control of a key lever 16, means is provided for starting the operation of the perforating device under control of the transmitting devices to insure that the same signal that is transmitted is also invariably perforated in the tape. To achieve this result, two pairs of contacts 71 (Fig. 1) are positioned over two adjacent transmitting cams 66, as more fully disclosed and described in copending application Serial No. 167,139 filed October 4, 1937 by R. A. Lake. The contacts 71 are mounted on a bracket 72 and associated with each pair of contacts 71 for controlling the operation of the same is a cam follower 73 or 74. In this manner, cam followers 73 and 74 ride into the depressions of their associated cams 66, which are the same depressions which act to operate the contact levers 64. The purpose of having two pairs of contacts 71, which are connected in parallel, (as shown in Fig. 3) is to impress a longer operating impulse on the perforating magnet 45 than would be obtained under the same conditions by a single pair of contacts. The contacts 71 are normally open, and when the transmitting cam distributor is operated, the circuit for the perforator magnet 45 will invariably be closed for the period of substantially two impulse intervals because of an overlap in the sequential operation of the pairs of contacts 71.

The keyboard mechanism shown in Fig. 1 is similar to that described and shown in U. S. Patent No. 1,965,572. With the mechanism shown in said patent, it is desired in some instances to transmit directly to a line circuit code combinations of impulses representative of the character key operated, while in other instances it may be more practical first to perforate a tape in accordance with the key operated, and then to transmit subsequently the signal corresponding thereto by subjecting the tape to a tape transmitter. To provide for the several possible conditions of operation of the mechanism, a switch is arranged in the keyboard apparatus to control the transmission of impulses directly to the line circuit, the perforation of a tape only, or the operation of the transmitting distributor and the perforator simultaneously.

To control these various operations, a switch lever 75 (Fig. 1) is provided which is mounted adjacent the transmitting distributor 14. Lever 75 assumes three positions; namely, an upper position 76A (Fig. 3), a middle position 76, and a lower position 76B, and is held in any one of these positions through the cooperation of a bracket 77. As shown in Fig. 3 switch member 75 is provided with a bifurcated end having strikers which cooperate with a group of five contacts 78. The position of the switch member 75 indicated at 76A is known as the "keyboard" position and is a position wherein only direct keyboard transmission of signals to the line is effected; that is, each time a key lever is operated, the transmitting cam drum is rotated a single cycle to transmit a code combination of signals through contacts 65 to the line. In this position of member 75 all of the five contacts of contact bank 78 are opened.

The position of switch member 75, indicated as 76, is known as the "tape and keyboard" position and is that condition of the apparatus wherein the perforator and transmitting mechanism are operating simultaneously. In this position, the contacts of the contact banks 78 are arranged as shown in Fig. 3, wherein the lower contact 82 remains closed, and in this position the energizing circuit for the perforating magnet 45 extends from positive battery over conductors 79 and 81, through contact 82, through contacts 71 associated with the transmitting cam, thence over conductor 83, through the winding of the perforating magnet 45, then to negative battery. From the previous description, it is observed that contacts 71 are closed periodically once for each cyclic rotation of the transmitting cam drum. In this manner, the operation of the perforator magnet 45 is assured.

The position of the switch member 75, indicated in Fig. 3 as 76B, is known as the "tape" position, and in this position, the automatic tabulating mechanism is not used.

According to the present invention, the keyboard perforator and transmitter of the type disclosed in U. S. Patent No. 1,965,572 is modified for the production of perforated tape to control the transmission of message matter embracing tabulation operations. To achieve this result, the typing unit 12 is provided with a tabulating mechanism, which will be now described. The typing unit, indicated generally as 12 in Fig. 1, includes a primary selecting mechanism represented by single selector magnet 91, shown in Fig. 1, and is of the T-shaped sword lever type, disclosed in U. S. Patent No. 1,745,633 to S. Morton et al., and a secondary selector or selector vane assembly indicated generally as 92. The selector vane assembly 92 controls, through a set of bell cranks 93, a corresponding set of curved code bars 94 carried in a movable type carriage, indicated generally as 95. As set forth in U. S. Patent No. 1,904,164, this type carriage is movable longitudinally with respect to a stationary platen (not shown), but manifestly the invention is not limited in its application to such apparatus.

The tabulating mechanism which is in accordance with U. S. Patent No. 2,076,864, comprises a tabulator bar 96, extending across the printer frame in front of the printing apparatus as shown in Fig. 1, which is provided with depending portions 97 and 98, through which the bar 96 is pivotally mounted on a bracket 99 carried in the printed frame. Thus, tabulator bar 96 is adapted to be swingable toward and away from the type carriage 12. Tabulator bar 96 is also provided with a longitudinal slot 101 extending substantially the entire length of the bar, within which extend movable stop members 102, which are clamped to the bars 61 by means of screws 103 and clamping members 104 (Fig. 2). As indicated in Fig. 4, these stop members 102 are provided with an inclined or cam portion 134, conformed to produce a quick action upon cooperating with a cam element 127, carried by the type carriage 12 to terminate suddenly the tabulating operation.

Tabulator bar 96 is also provided, intermediate the depending portions 97 and 98 and suitably positioned relative to a tabulating function lever 105, with another depending portion 106. Attached to and depending from portion 106 is a bar 107, the lower end of which is provided with an aperture 108 (Fig. 2) having its upper right-hand corner formed so as to provide a re-entrant stepped portion 109. The tabulator bar 96 normally tends to move in a clockwise direction, as viewed in Fig. 2, due to the action of a spring 111.

Cooperating with the stepped portion 109 is one arm 112 of a lever 113 pivoted at 114. The extremity of arm 112 is provided with a laterally disposed portion 115 which cooperates with portion 109 of member 107. At the end of arm 116 of lever 113 is carried a vertically extending member 117, the upper end of which is provided with an open-ended slot adapted to engage a pin 118 carried by the upper escapement pawl 119 of the spacing mechanism which is fully described and shown in U. S. Patent 2,076,864.

The selector vanes 92 control a series of function levers, including a tabulator function lever 105. Function lever 105 is provided on its arm 121 with code notches and projections which cooperate with the vanes of the selector vane assembly 92, and which are coded to correspond with the tabulator signal. Thus, when the vanes 92 are set according to the tabulator signal in response to the operation of the selector mechanism 91, the tabulator function lever 105 will be selected and will be urged toward the selector vanes 92 by its spring 122 about its pivot rod 123.

Function lever 105 is provided with a horizontal portion 124, so conformed that its extremity 125 engages the lower edge of arm 116 of lever 113 so that, when function lever 105 (upon its selection) is permitted to rotate in a counterclockwise direction under the action of its spring 122, the end 125 thereof is raised, thus rotating lever 113 against the tension of its spring 120. The laterally disposed end 115 of arm 112 is thereby moved downwardly clear of the stepped portion 109, permitting spring 111 to urge the tabulator bar 96 inwardly (or clockwise as viewed in Fig. 2) until wall 126 of memer 107 engages the laterally disposed portion 115. Adjustable stops 102 are moved inwardly into the path of a cam member 127 (Fig. 4), which is pivoted at 128 on a portion 129 integrally formed on a bar 131, which is comparable to bar 53, shown in Fig. 1 of Patent No. 1,904,164, and which is employed for retaining the bell crank levers 93 in operable relation to vanes 92. Cam 127, like bar 131 and bell crank 93, is movable with the type carriage 95 for carriage spacing and normally tends to rotate in a clockwise direction about pivot 128 due to the action of a spring 132, but its clockwise rotation is limited by the coaction of a stop pin 133, carried thereon, with the end of bar 131. Consequently, upon the rightward movement of type carriage 95 (as viewed in Fig. 1) cam 127, due to its limited rotatability in a clockwise direction, will, by its camming action on stop member 102, rock tabulator bar 96 outwardly; but upon any irregular leftward movement of type carriage 95, cam 127, upon striking the series of stop members 102, will be rotated counterclockwise against the action of spring 132, avoiding operation of the cam portion 134.

When the tabulator bar is thus actuated outwardly by the cam 127, against the action of spring 111, the laterally disposed portion 115 of lever 113 will escape the stepped portion 109 and through the action of spring 120 will resume its upward position shown in Fig. 2.

As a result of the aforementioned operation of lever 113 upon the selection of the tabulator function lever 105, the spacing pawl 119 is lifted out of engagement with the spacing ratchet 135 by the link 117, and is held out of engagement with ratchet 135 so long as the laterally disposed portion 115 is restrained by the stepped portion 109, which is as long as, or for the period of time which, it takes the carriage 95 to carry the cam 127 to the next tabulator stop 102, when, due to the camming out of the tabulator bar 96, the lever 113 is released to respond to the action of its spring 126, whereupon the spacing pawl 119 is permitted to return into engagement with the ratchet 135 to stop the carriage 95.

It is an object of the present invention to perforate the tape to correspond to the tabulating time as well as for the tabulation initiating code signal. To achieve this result, a mechanism is provided including a lever 136 pivoted at 137. One arm 138 of lever 136 cooperates with the laterally disposed portion 115 of lever 112, and the other arm 139 is articulated through slot and pin to an arm 141 of a bell crank lever 142, pivoted at 143. The depending arm 144, of bell crank 142, is bifurcated at its extremity, one prong 145 of which cooperates with the code bar 19, of one of the pairs of code bars and the other prong 146 cooperates with a latch lever 147 pivotally carried on the front code bar 21, companion to bar 19. Latch 147 normally tends to rotate in a clockwise direction (as viewed in Fig. 1) under the action of a spring 148. Latch lever 147 cooperates with a lever 149, pivoted at 151 to the front code bar 21. Lever 149 is normally held against a stop 152 by a spring 153. Lever 149 is thus normally biased in a counterclockwise direction and is provided with an upstanding portion 154 which cooperates with the tabulator key lever 16. Positioned above the articulation of arms 139 and 141, of levers 136 and 142 respectively, is an arm 155 of a lever 156 pivoted at 157 (Fig. 2). Arm 158 of lever 156 is so conformed as to cooperate with the upper surface of clutch release lever 56 of clutch 68.

When the tabulator key lever 16 is depressed, it acts to set the several pairs of code bars 19 and 21 to correspond to the tabulator code signal. In so doing, key lever 16 cooperates with lever 149, which is latched in its upper position by lever 147, to depress the code bar 21, the upstanding portion 154 functioning as a ward or projection. The ward normally supplied on code bar 21 is removed when the device according to the present invention is employed, the function of the removed ward being served by lever 149. When the tabulator key lever 16 is thus depressed, the interponents 41 are set correspondingly through the links 31, connecting bars 43 and levers 42 to prepare the perforating mechanism for the perforation of the tabulator code signal in the tape 36. Also, the depression of the tabulator key lever 16 effects, through the universal bar, (not shown) the disengagement of the clutch release lever 56 from the clutch 68, permitting the clutch members to engage, to cause the rotation of the shaft 67. The locking latches 62 have also been set to correspond with the tabulator code signal so that when the cams 66 rotate with shaft 67, the contacts 65 are closed in conformance with the tabulator signal, thereby energizing the selector magnet 91 accordingly. The operation of the selector mechanism associated with selector magnet 91 in response to the tabulator code causes the vanes 92 to be set correspondingly, whereupon the function lever 105 is selected and its arm 124, through end 125, causes the counterclockwise rotation of lever 113 about its pivot 114 against the action of its spring 120. Through the laterally disposed portion 115, lever 113 is latched in its counterclockwise position, as previously described, to hold the spacing pawl 119 out of engagement with spacing ratchet 135. Likewise, the laterally disposed portion 115 acts through projection 138 to hold the lever 136 in its counterclockwise position, thus raising arm 139. This movement of lever 136 will, through the slot and pin articulation between arms 139 and 141, cause bell crank lever 142 to rotate in a clockwise direction. While levers 136 and 142 are thus held by the laterally disposed portion 115 of lever 113, lever 156 is also held, through arm 155, in its clockwise position, thus acting through end 158 to reoperate and to hold the clutch release lever 56 out of engagement with the clutch 68, thereby permitting clutch 68 to rotate continuously. The clockwise rotation of lever 142 will cause, through prong 145, the depression of permutation bar 19. However, to permit the depression of permutation bar 19, in case the manual operator should be holding down the key lever 16, the prong 146 first acts upon the lever 147 to cam it in a counterclockwise direction against the action of spring 148 to disengage said latch lever 147 from lever 149, unlatching the lever 149.

Automatically changing the position of the permutation bars 19 and 21, through the action of bell crank lever 142, effects a change in the position of associated link 31, which, in turn, effects a change in position of its associated interponent 41. Thus, during the subsequent operation of the perforator the code signal perforated by the perforator 13 and also transmitted by the transmitter 14 will no longer correspond to the tabulator initiating code, but will represent some predetermined signal, preferably a non-spacing non-printing code signal. The tabulator initiating code signal and the tabulator continuing code signal may be so chosen that they differ by but one permutation element, the levers 147 and 149 being installed upon a permutation bar of that element of the code. The operation of the perforating mechanism will continue so long as the cam drum 66 is permitted to rotate, and this is timed by the approach of the cam 127 to the tabulator stop 102.

When the cam 127 reaches the next tabulator stop 102, the tabulator bar 96 will be cammed outwardly and the laterally disposed portion 115 of lever 113 will ride off the step portion 109 and be returned to its clockwise position by its spring 120, thereby permitting the upper space pawl 119 to return into engagement with spacing ratchet 135 to stop the progress of the carriage. At the same time, the restraint is removed from lever 136, whereupon levers 136 and 142 return to their normal positions as shown in Fig. 2. Also, lever 156 returns to its counterclockwise position, thus removing its control or restraint from the clutch release lever 56, which in turn is permitted to cooperate with the clutch 68 to disengage said clutch.

As a result of the momentary operation of the tabulator bar 96, the perforating and transmitting operations for the tabulator continuation code signal will cease. Upon the release of the lever 144 it will be returned to its upward position by its spring 158 and lever 149 will be returned to its counterclockwise position against stop 152 by its spring 153, and into latching engagement with latch lever 147, in which condition the mechanism is in readiness for the next tabulation operation.

With the apparatus just described, a printed copy or home record is produced, corresponding to the perforations made in the tape. Furthermore, not only is a home record made of ordinary straight matter, but a record is made of matter containing tabulated portions, and the perforated tape is so produced as to compensate for the tabulating time, so that when utilizing the tape for retransmission, transmission need not be suspended during tabulation time because sufficient non-spacing and non-printing code combinations of tabulating continuing nature have been perforated in the tape to permit the carriage at the remote printer to move between tabulation stops. With the apparatus according to the present invention, the perforated tape is made to correspond with variable tabulating periods so that there is no undue loss of line time.

Although a particular embodiment of the invention has been described herein, it will be understood that the apparatus is capable of many modifications, and it is contemplated that all changes which come within the range and scope of equivalency are intended to be embraced within the purview of the appended claims.

What is claimed is:

1. In a telegraph system, the combination of signal determining means, means for exercising under certain operating conditions a predetermined control over said signal determining means, a receiver responsive to signaling conditions comprising a selectable instrumentality, and means controlled by said instrumentality and effective while said second recited means is operating under said certain operating conditions for automatically varying the control exercised by said second recited means over said signal determining means.

2. In a telegraph system, the combination of a plurality of transmitting contacts, cam means for controlling said contacts, means for exercising under certain operating conditions a predetermined control over said cam means, receiving means responsive to signaling conditions comprising a selectable instrumentality, and a lever system controlled by said instrumentality and effective while said second recited means is operating under said certain operating conditions for automatically varying the control exercised by said second recited means over said cam means.

3. In a telegraph system, the combination of a plurality of transmitting contacts, cam means for controlling said contacts, a selector mechanism for exercising under certain operating conditions a predetermined control over said cam means, a receiver responsive to signaling conditions comprising a selectable instrumentality, and means controlled by said instrumentality and effective while said selector mechanism is operating under said certain operating conditions for automatically varying the control exercised by said selector mechanism over said cam means.

4. In a telegraph system, the combination of a plurality of transmitting contacts, cam means for controlling said contacts, a key operated selector mechanism for exercising a predetermined control over said cam means, a receiver responsive to signaling conditions comprising a selectable instrumentality, and means controlled by said instrumentality and operable irrespective of the continued actuation of the key operated for varying the control exercised by said selector mechanism over said cam means.

5. In a telegraph keyboard mechanism, a set of elements, corresponding pairs of code bars for setting said elements in different combinations, a plurality of keys, each arranged to move the bars of every pair transversely of their lengths in opposite directions and selectively set all of said elements, and means to effect a resetting of said elements irrespective of the continued actuation of an operated key.

6. In a permutation keyboard for telegraph apparatus, a set of permutation elements, a plurality of vertically movable key levers, horizontally disposed code bars engaged and shifted vertically by said key levers to positively set all of said elements, each in either one of two positions, said elements being arranged under certain operating conditions to retain the setting effected by a key lever until the same is changed by the operation of another key lever, and means arranged under other operating conditions to effect a resetting of said elements irrespective of the continued actuation of an operated key lever.

7. In a selector mechanism, a plurality of pairs of code bars having code projections on their edges, means for rendering certain of said projections independently displaceable, and means effective under certain operating conditions to control said means to effect through the instrumentality of said bars the displacement of said certain of said projections.

8. In a permutation keyboard for telegraph apparatus, a plurality of vertically movable key levers, a plurality of pairs of code bars having code projections on their edges, certain of said projections being displaceable, a pair of pivoted rock arms engaging each pair of code bars to compel the vertical movement thereof in opposite directions in response to the operation of said key levers, and means effective under certain operating conditions to control the displacement of said certain of said projections and to alter the setting of certain of said code bars whereby a different permutative arrangement of said plurality of pairs of code bars may be obtained irrespective of the continued actuation of an operated key lever.

9. In a telegraph system, the combination of a transmitter comprising a number of pairs of code bars having code projections on their edges, certain of said projections being displaceable, a receiver including a selectable instrumentality, means responsive to signaling conditions to select said instrumentality, and means controlled by said instrumentality to control the displacement of said certain of said projections whereby the alteration of the permutative setting of said pairs of code bars is facilitated.

10. In a telegraph system, the combination of a plurality of transmitting contacts, cam means for controlling said contacts, means for controlling said cam means comprising a plurality of pairs of code bars having code projections on their edges, certain of said projections being displaceable, a receiver including a functional instrumentality, means responsive to signaling conditions to select said instrumentality, and means controlled by said instrumentality to effect the displacement of said certain of said projections to alter the control of said second recited means on said cam means.

11. In a telegraph system, the combination of a plurality of transmitting contacts, cam means for controlling said contacts, means for controlling said cam means comprising a plurality of pairs of code bars having code projections on their edges, certain of said projections being displaceable, receiving means comprising a functional instrumentality, means responsive to signaling conditions to select said instrumentality, and a lever system controlled by said instrumentality to effect the displacement of said certain of said projections to alter the control of said second recited means on said cam means.

12. In a telegraph system, the combination of a plurality of transmitting contacts, cam means for controlling said contacts, a selector mechanism for exercising a predetermined control over said cam means comprising a plurality of pairs of code bars having code projections, certain of said projections being displaceable, a receiver comprising a functional instrumentality, means responsive to signaling conditions to select said instrumentality, and means controlled by said instrumentality and effective to displace said certain of said projections to alter the control exercised by said selector mechanism over said cam means.

13. In a telegraph keyboard mechanism, electrical contacts, means for operating said contacts for the transmission of code signals, a perforator, a plurality of key levers, a set of code bars movable transversely of their length by said key levers upon their actuation, means common to said contacts and said perforator and operated by said code bars for conditioning for operation said contacts and perforator simultaneously, and means effective under certain operating conditions for altering, through said code bars, the condition of said contacts and said perforator irrespective of the period of actuation of said key levers.

14. In a telegraph mechanism, electrical contacts, means for operating said contacts for the transmission of code signals, a perforator, a plurality of key levers, a set of code bars movable upon the operation of the key levers in varying permutations, means common to said contacts and said perforator and operated by said code bars for conditioning said contacts and perforator simultaneously, and means effective under certain operating conditions to alter the permutative setting of said code bars irrespective of the period of operation of the key levers.

15. In a telegraph mechanism, a plurality of signal determining means, a plurality of key levers, a set of code bars movable upon the operation of the key levers in varying permutations, means common to said plurality of means for effecting the operation of said plurality of means simultaneously, and means effective under certain operating conditions for altering, through said code bars, the condition of said plurality of signal determining means irrespective of the period of operation of said key levers.

16. In a telegraph system, the combination of a plurality of signal determining means, means for exercising under certain operating conditions a predetermined control over said plurality of signal determining means, receiving means responsive to signaling conditions comprising a selectable instrumentality, and a lever system controlled by said instrumentality and effective while said second recited means is operating under said certain operating conditions for automatically varying the control exercised by said second recited means over said signal determining means.

17. In a telegraph system, the combination of a transmitter, means for exercising under certain operating conditions a predetermined control over said transmitter, a receiver responsive to signaling conditions comprising a selectable instrumentality, and means controlled by said instrumentality and effective while said first recited means is operating under said certain operating conditions for automatically varying the control exercised by said first recited means over said transmitter.

18. In a telegraph system, the combination of a perforator, means for exercising a predetermined control over said perforator, a receiver responsive to signaling conditions comprising a selectable instrumentality, and means controlled by said instrumentality for varying the control exercised by said first recited means over said perforator.

19. In a telegraph apparatus, a perforator comprising a plurality of punch interponents, means for controlling said interponents, a selector mechanism for exercising a predetermined control over said means, a receiver responsive to signaling conditions comprising a selectable instrumentality, and means controlled by said instrumentality and effective through said selector mechanism for varying the control exercised by said selector mechanism over said interponent controlling means.

20. In a telegraph apparatus, a plurality of signal determining means, selector mechanism for exercising a predetermined control over said means, a movable carriage, tabulating mechanism effective under control of said selector mechanism to control the uninterrupted advancement of said carriage through a plurality of spaces at a time, and means controlled by said tabulating mechanism to vary the control exercised by said selector mechanism over said signal determining means during said uninterrupted advancement of said carriage.

21. In a recorder, selector mechanism responsive to received code combinations of signaling impulses, a carriage movable normally one character space for each recording operation, means controlled by said selector mechanism for causing said carriage to advance uninterruptedly through a plurality of spaces at a time from one recording position to another, a keyboard selector mechanism, a plurality of signal determining means normally controlled by said keyboard selector mechanism, and means included in said first mentioned selector mechanism and effective under the control of said first recited means to vary the control of said keyboard selector mechanism over said signal determining means.

22. In a telegraph system, the combination of a manually operable keyboard mechanism, a tabulator mechanism responsive thereto, and a tape perforator responsive to control by said keyboard mechanism and responsive also to control by said tabulator mechanism.

23. In a telegraph system, the combination of a manually operable keyboard mechanism, a tabulator mechanism responsive thereto, and a tape perforator responsive to control by said keyboard mechanism and responsive also to control by said tabulator mechanism, through said keyboard mechanism.

24. In a telegraph system, the combination of a manually operable keyboard mechanism, a tabulator mechanism responsive thereto, a tape perforator responsive to control by said keyboard mechanism, means in said keyboard mechanism to initiate operation of said perforator, and means in said tabulator mechanism to continue operation of said perforator.

25. In a telegraph system, the combination of a manually operable keyboard mechanism, a tabulator mechanism responsive thereto, and a tape perforator responsive to control by said keyboard mechanism to perforate a tabulation initiation code signal said perforator responsive also to control by said tabulator mechanism and said keyboard mechanism jointly to perforate a tabulation-time-continuation code signal.

26. In a telegraph system, a keyboard, a perforator responsive to said keyboard, a tabulator responsive to said keyboard, and means in said tabulator to control said perforator.

27. In a telegraph system, a keyboard, a cyclic transmitter controlled by said keyboard, a tabulator mechanism responsive to said transmitter to advance one unit of distance for each cycle of operation of said transmitter, means in said tabulating device to control said transmitter to operate continuously in repeated cyclic operations, further means in said tabulating device to advance the carriage of said device three units of distance for each of said second mentioned cyclic operations of said transmitter, and a tape perforator controlled jointly by said keyboard and said transmitter and operated invariably once for each cyclic operation of said transmitter.

28. In a telegraph system, a keyboard, a cyclic transmitter controlled by said keyboard, a tabulator mechanism responsive to said transmitter to advance one unit of distance for each cycle of operation of said transmitter, means in said tabulating device to control said transmitter to operate continuously in repeated cyclic operations, further means in said tabulating device to advance the carriage of said device a plurality of units of distance for each cyclic operation of said transmitter, and a tape perforator controlled jointly by said keyboard and said transmitter and operated invariably once for each cyclic operation of said transmitter.

29. In a telegraph system, a tabulator device, a keyboard transmitter controlling said tabulator device to exercise reverting control upon said keyboard transmitter, means to advance the carriage of said tabulator device in stepping manner through a unit distance per step, further means for advancing the carriage of said tabulator device in continuous movement through a plurality of unit distances, a tape perforator, and means to operate said perforator once for each unit step of said tabulator device when operating in stepping manner and once for each three unit distances of carriage movement of said tabulator devices when moving in continuous manner.

30. In a telegraph system, a tabulator device, a keyboard transmitter controlling said tabulator device, means to advance the carriage of said tabulator device in stepping manner through a unit distance per step, further means responsive to keyboard transmitter control for advancing the carriage of said tabulator device in continuous movement through a plurality of unit distances, a tape perforator, and means responsive to said tabulator device to operate said perforator repeatedly when said tabulator device is advancing in continuous movement, the number of operations of said perforator being smaller than the number of carriage unit distances traversed by said carriage.

31. In a selector mechanism, a plurality of pairs of bars having selection determining means, means for rendering certain of said selection determining means independently displaceable, and means effective under certain operating conditions to control said second recited means to effect through the instrumentality of said bars the displacement of said certain of said selection determining means whereby the alteration of the permutative setting of said plurality of pairs of bars is facilitated.

32. In a selector mechanism, a plurality of pairs of bars having selection determining means, means for rendering certain of said selection determining means independently displaceable, and means effective under certain operating conditions to control said second recited means to condition said certain of said selection determining means for displaceability whereby the alteration of the permutative setting of said plurality of pairs of bars is facilitated.

33. In a keyboard mechanism, a series of key levers, a plurality of pairs of bars having selection determining means co-operable with said key levers, means for rendering certain of said selection determining means independently displaceable, and means effective under certain operating conditions to control said second recited means to effect, through the co-operative relationship between said key levers and bars, the displacement of said certain of said selection determining means whereby the alteration of the permutative setting of said plurality of pairs of bars is facilitated.

34. In a telegraph apparatus, a platen, type carrying mechanism, means for producing relative movement between said platen and said type carrying mechanism, a plurality of signal determining means, selector mechanism for exercising a predetermined control over said signal determining means, tabulating mechanism effective under the control of said selector mechanism to control uninterruptedly the relative movement between said platen and said carriage a predetermined amount, and means controlled by said tabulating mechanism to vary the control exercised by said selector mechanism during said uninterrupted movement over said signal determining means.

35. In a telegraph system, a keyboard controlled signal transmitter normally operative to transmit a single code group of impulses on each actuation of a key lever, a recording mechanism selectively responsive to code groups of impulses transmitted from said transmitter, key lever controlled means for initiating the transmission of a succession of code groups and means including said receiving mechanism for terminating the transmission of said succession of code groups.

36. In combination, a keyboard transmitting mechanism normally operative to transmit a single code group of impulses on each actuation of a key lever, a receiving mechanism selectively controlled by said transmitting mechanism having a printing unit and a recording paper movable relative to one another, key lever controlled means at said transmitting mechanism to initiate the transmission of a plurality of successive groups of impulses and adjustable means at said receiving mechanism for interrupting the transmission of said plurality of successive code groups at various points in the relative movement of said printing unit and said recording paper.

37. In combination, a keyboard transmitting mechanism normally operative to transmit a single code group of impulses on each actuation of a key lever, a receiving mechanism selectively controlled by said transmitting mechanism having a printing unit and a recording paper movable to one another, key lever controlled means at said transmitting mechanism to initiate the transmission of a plurality of successive code groups of impulses, and automatic means controlled by the relative movement of said printing unit and said recording web for interrupting transmission of said plurality of successive code groups at predetermined positions in the relative movement of said printing unit and said recording paper.

ALBERT H. REIBER.

CERTIFICATE OF CORRECTION.

Reissue No. 22,453. March 7, 1944.

ALBERT H. REIBER.

It is hereby certified that error appears in the printed specification of the above numbered patent requiring correction as follows: Page 8, second column, line 60-61, claim 34, after "movement" strike out "over said signal determining means" and insert the same after "mechanism" in line 59, same claim; page 9, second column, line 3, after "movable" insert --relative--; and that the said Letters Patent should be read with this correction therein that the same may conform to the record of the case in the Patent Office.

Signed and sealed this 30th day of May, A. D. 1944.

Leslie Frazer (Seal) Acting Commissioner of Patents.